ND DISPLAY SYSTEM
Hyman P. Mansberg, Northport, N.Y., assignor, by mesne assignments, to the United States of America as represented by the Secretary of the Navy
Filed Feb. 21, 1962, Ser. No. 174,924
1 Claim. (Cl. 73—342)

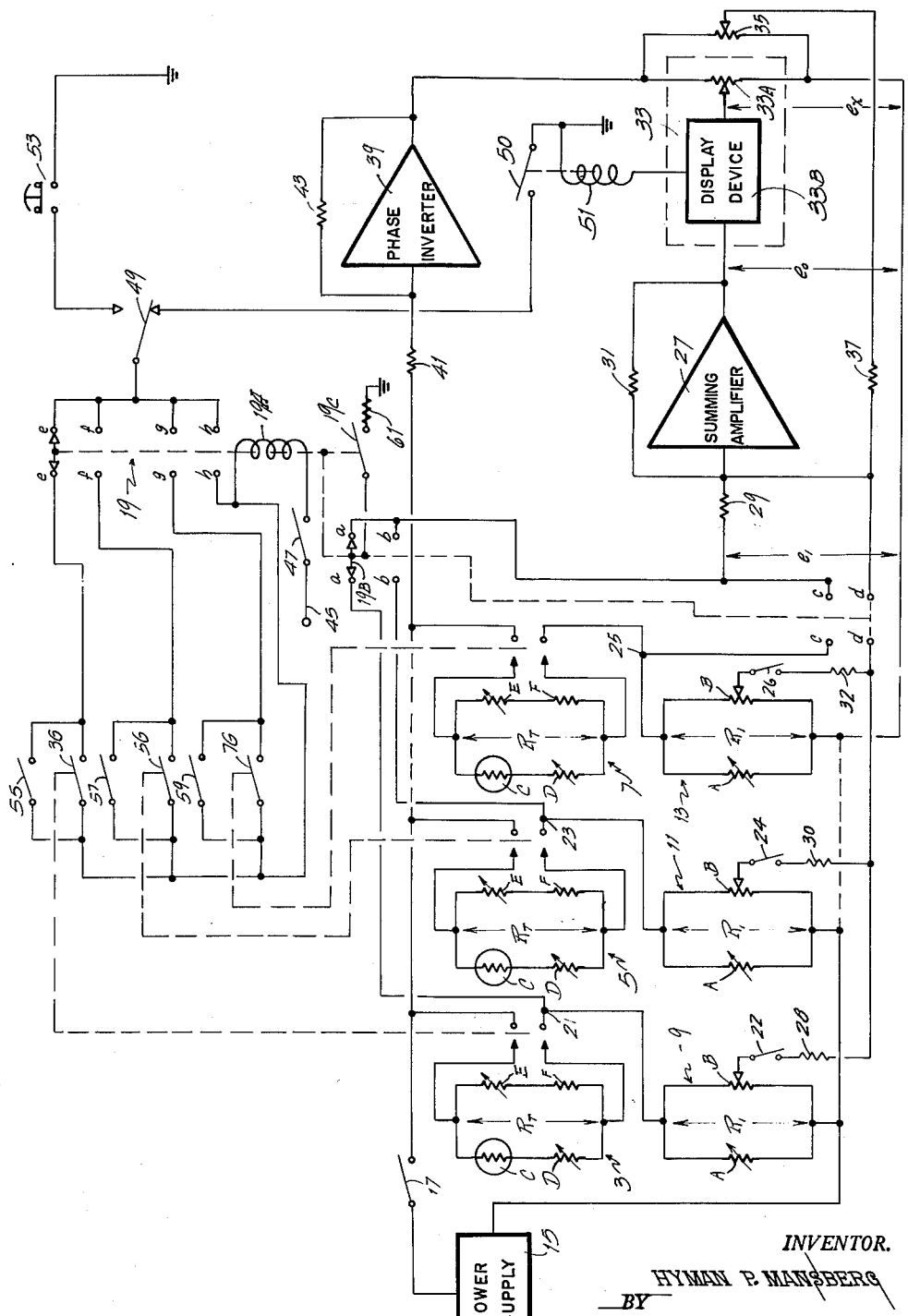

The present invention relates to a novel and improved temperature measuring system and more particularly to novel and improved apparatus for successive high precision measurement and display of multipoint body temperatures as well as the weighted-mean body temperature.

In the design and construction of pressure suits and the like for use in high altitude and space travel it is often necessary to provide a suitable ventilating system to dissipate body heat produced by normal physiological processes involving the breakdown of food to obtain energy. In effective evaluation of such ventilation systems the rectal temperature as well as the skin temperature, which often varys markedly from one region of the body to another, must be continuously, accurately and rapidly monitored. Temperature sensing elements or probes are therefore normally fastened to suitable points of the body. The reading of each sensor is then weighted by a factor proportional to the importance of the area measured to ultimately provide a suitable mean body temperature.

Although various types of apparatus have been devised and used in the past for this purpose, considerable difficulty has been experienced heretofore in providing such apparatus which is highly reliable and which provides readings that are immediately available.

It is therefore a principal purpose of the present invention to provide a novel and improved temperature measuring system in which a plurality of temperature sensitive points are continuously and accurately monitored.

It is a further object of the present invention to provide novel and improved temperature measuring apparatus in which a plurality of temperature sensitive points are successively recorded by means of an automatic stepping mechanism.

It is a further object of the present invention to provide novel and improved temperature measuring apparatus in which a plurality of temperature sensitive points are measured, weighted and averaged to provide a mean overall temperature reading.

Other objects and many of the attendant advantages of this invention will be readily appreciated as the same becomes better understood by reference to the following detailed description when considered in connection with the accompanying drawing wherein:

The single figure of the drawing is a diagrammatic view of a preferred embodiment of the present invention.

Referring now to the said single figure of the drawing, it will be noted that any suitable number of linearized thermistor networks such as those indicated at 3, 5, and 7 may be electrically connected in series with their associated weighting circuits 9, 11, and 13 across the low voltage direct current power supply 15 and power switch 17. Each weighting circuit preferably includes the parallel connected variable resistor A and potentiometer B which presents a total resistance $R_1$ to the circuit. Each thermistor network includes the series connected highly stabilized thermistor C and variable resistor D in parallel with the series connected variable resistor E and fixed resistor F. The parameters of resistances D, E, F and $R_1$ are chosen such that within the operable temperature range the exponentially decreasing resistance vs. temperature characteristic of the thermistor is offset by the hyperbolic characteristic of $Rt$ vs. $e_1$. In this way the change of resistance of the thermistor with a change in temperature is substantially linear.

The step switching mechanism 19 which is of any suitable conventional design successively interconnects its contacts $a$—$a$, $b$—$b$, $c$—$c$, and $d$—$d$. In so doing, switch 19 first successively couples the junctions 21, 23 and 25 of the thermistor and weighting networks to the summing amplifier 27 through resistor 29. Switch 19 then engages its contacts $d$—$d$ and connects the variable arms of potentiometers 9B, 11B and 13B to the summing amplifier 27 respectively through switches 22, 24 and 26 and respectively through resistors 28, 30, and 32. Resistor 31 which is equal in resistance to resistor 29 is connected as shown in parallel with summing amplifier 27. The digital ratiometer 33 is coupled to the output of summing amplifier 27. Inasmuch as the ratiometer 33 is of conventional design and since its specific structure forms no part of the present invention, the same is not included herein in detail for the sake of simplicity. For a complete understanding of the invention it need only be understood that the variable arm of potentiometer 33A is continuously automatically adjusted until the potential $e_x$ equals the potential $e_0$. When this occurs, a suitable galvanometer or the like not shown in the drawing nulls and the digital display device 33B is energized and registers the final disposition of the variable arm of potentiometer 33A at null. Potentiometer 35 is connected in parallel with potentiometer 33A and as will be more apparent hereinafter provides feedback through resistor 37 to the input circuit of summing amplifier 27. Resistor 37 is equal in resistance to resistors 29 and 31. Phase invertor 39 is energized by the low voltage power supply 15 through power switch 17, resistor 41 and the parallel arrangement of potentiometers 33A and 35. Resistor 43 which is connected in parallel with phase inverter 39, is equal in resistance to resistors 29, 31, and 41.

Coil 19A of stepping switch 19 is energized by a circuit that extends from 110 volt direct current power supply line 45 through power switch 47, through coil 19A, through the parallel arrangement of switches 3G, 5G and 7G and switch contacts $e$—$e$, $f$—$f$, $g$—$g$ and $h$—$h$, through the lower position of manually controlled switch 49 and through contact 50 of relay 51 to ground. Relay 51 is energized in any suitable conventional manner each time the galvanometer of the ratiometer nulls and the display device 33B registers. When manual rather than automatic operation of the system is desired, switch 49 is moved to its upper position and the energizing circuit for coil 19A is grounded through the push button switch or the like 53. Switches 3G, 5G and 7G remain normally open until their associated jack assembly or the like 3, 5 and 7 are plugged into the circuit. Manual switches 55, 57 and 59 are preferably connected as shown in parallel with jack switches 3G, 5G and 7G. The stepping armature 19B of switch mechanism 19 in addition to successive engagement of with its various contacts is also electrically connected to ground as shown through contact 19C of coil 19A and resistor 61, contact 19C being of the type that is energized each time coil 19 is pulsed and stepping armature 19B engages another pair of contacts.

In operation, when power switches 17 and 47 are closed, switch 49 occupies its lowermost position, and thermistor assemblies 3, 5, and 7 are plugged into the circuit, the switching mechanism 19 successively completes the circuit between each thermistor assembly and the summing amplier 27. In this way the potential at the junction of resistance $R_1$ and each thermistor assembly is successively fed through amplifier 27 to the ratiometer 33. The ratiometer then automatically adjusts potentiometer 33A such that the potential at $e_0$ equals the potential at $e_x$. When this occurs, the display device 33B records its digital reading, relay 51 is energized, and coil 19A of the switching mechanism is pulsed so as to cause its stepping armature 19B to engage its next pair of contacts. Phase inverter 39 reverses the polarity of the signal applied across potentiometer 33A without effective change in its amplitude. Similarly amplifier 27 reverses the polarity of its output signal to ratiometer 33B without effective change in its amplitude. In this way both input circuits to ratiometer 33B are effected similarly by any variation in potential of power supply 15 and error due to any such change of power supply potential is eliminated. The variable arm of potentiometer 35 is adjusted such that its feedback through resistor 37 to the input circuit of amplifier 27 in effect converts the digital display or the ratiometer from a mere indication of the position of the variable arm on its potentiometer 33A to a direct temperature reading of the measured point in degrees centigrade.

When the stepping armature 19B of the switch mechanism engages contacts d—d, energization of amplifier 27 is controlled by each of the thermistor assemblies through the variable arms of potentiometers 9B, 11B and 13B. Potentiometers 9B, 11B and 13B have been preadjusted according to the relative weight or degree of importance of each temperature measurement on the total mean temperature. Summing resistors 28, 30 and 32 which are equal in resistance to resistor 29 provide a signal at the input to the summing amplifier equal to the sum of all the voltages at the arms of potentiometers 9B, 11B and 13B. This signal is then fed through amplifier 27 to ratiometer 33 which balances the potentials at $e_0$ and $e_x$. Display device 33B is then energized to provide the desired mean temperature and relay 51 and switch 19 are energized to recycle the entire operation.

Each time switch 19 is energized it will be noted that its stepping armature 19B is grounded through armature 19C and resistor 61. This provides a transient pulse each time a new measurement is to be recorded so that the balancing process in the ratiometer will function properly when successive thermistor readings are substantially identical.

As indicated hereinabove, switches 3G, 5G and 7G are closed when their respective thermistor assemblies 3, 5 and 7 are connected into the circuit. Each of these switches preconditions a circuit for the energization of coil 19A of switch mechanism 19. When one or more of the thermistor assemblies is not plugged into the circuit, the energizing circuit for coil 19A is left open and the automatic stepping operation is interrupted. When use of one or more of the thermistor assemblies is not desired, the thermistor assemblies that are plugged into the circuit may be continuously scanned without interruption by closing manually controlled switches 55, 57 and/or 59, which may be ganged with switches 22, 24 and 26 in the weighting circuits.

Obviously many modifications and variations of the present invention are possible in the light of the above teachings. It is therefore to be understood that within the scope of the appended claim the invention may be practiced otherwise than as specifically described.

What is claimed is:

Temperature measuring apparatus comprising:
(a) a source of electrical potential;
(b) a plurality of thermistors positioned at various temperature sensitive locations;
(c) means for linearizing the resistance temperature characteristic of each thermistor;
(d) an impedance connected in series with each thermistor;
(e) means for coupling each of the thermistor impedance series network in parallel across the source of potential;
(f) a rationmeter which provides a digital display of the ratio of its input signal to the source of potential when its servo mechanism nulls;
(g) means for unbalancing the ratiometer after each null;
(h) means for successively coupling the potential at the junction of each thermistor with its impedance to the ratiometer;
(i) and means effective after the potential at the junction of each thermistor with its series connected impedance has been successively coupled to the ratiometer for averaging a predetermined weighted value of each said potential and coupling the resulting mean potential to the ratiometer.

References Cited by the Examiner

UNITED STATES PATENTS

| | | | |
|---|---|---|---|
| 2,691,889 | 10/54 | Dion et al. | 73—342 |
| 2,753,713 | 7/56 | Mabey | 73—342 |
| 2,870,436 | 1/59 | Kuder | 324—99 |
| 3,025,466 | 3/62 | Beers | 324—62 |

ISAAC LISANN, *Primary Examiner.*

LOUIS R. PRINCE, *Examiner.*